United States Patent
Arlt et al.

(10) Patent No.: US 8,434,294 B2
(45) Date of Patent: May 7, 2013

(54) METHOD AND DEVICE FOR DETERMINING A DYNAMIC TIME DURATION FOR EXHAUST GAS PROBES OF AN INTERNAL COMBUSTION ENGINE

(75) Inventors: Tino Arlt, Regensburg (DE); Krzysztof Korbel, Regensburg (DE); Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 284 days.

(21) Appl. No.: 12/946,043

(22) Filed: Nov. 15, 2010

(65) Prior Publication Data

US 2011/0113751 A1 May 19, 2011

Related U.S. Application Data

(62) Division of application No. 11/794,070, filed as application No. PCT/EP2005/055817 on Nov. 8, 2005, now Pat. No. 7,849,671.

(30) Foreign Application Priority Data

Dec. 23, 2004 (DE) .......................... 10 2004 062 408

(51) Int. Cl.
*F01N 3/00* (2006.01)

(52) U.S. Cl.
USPC ................. 60/276; 60/274; 60/285; 701/103; 701/109

(58) Field of Classification Search ............. 60/274, 60/276, 277, 285; 701/103, 109
See application file for complete search history.

(56) References Cited

U.S. PATENT DOCUMENTS

| | | | | |
|---|---|---|---|---|
| 5,966,930 | A | 10/1999 | Hatano et al. | 60/276 |
| 6,637,194 | B2 * | 10/2003 | Kakuyama et al. | 60/285 |
| 6,988,359 | B2 * | 1/2006 | Ide et al. | 60/285 |
| 7,069,719 | B2 * | 7/2006 | Takubo et al. | 60/285 |
| 7,198,952 | B2 * | 4/2007 | Uchida et al. | 436/37 |
| 7,343,734 | B2 | 3/2008 | Aliakbarzadeh et al. | 60/277 |
| 7,412,820 | B2 | 8/2008 | Iida et al. | 60/274 |
| 7,849,671 | B2 * | 12/2010 | Arlt et al. | 60/274 |
| 8,146,347 | B2 * | 4/2012 | Odendall | 60/285 |
| 2002/0157379 | A1 | 10/2002 | Kakuyama et al. | 60/276 |
| 2004/0006971 | A1 | 1/2004 | Kamoto et al. | 60/277 |
| 2004/0040286 | A1 | 3/2004 | Fiengo et al. | 60/285 |

FOREIGN PATENT DOCUMENTS

| | | |
|---|---|---|
| DE | 10232385 | 8/2003 |
| DE | 10307010 | 5/2004 |

OTHER PUBLICATIONS

German Office Action for Application No. 10 2004 062 408.9 (4 pages), May 29, 2006.

* cited by examiner

*Primary Examiner* — Binh Q Tran
(74) *Attorney, Agent, or Firm* — King & Spalding L.L.P.

(57) ABSTRACT

An exhaust catalyst is charged with oxygen until saturated. A given first rich air/fuel ratio (LAM1_SP) is set in a combustion chamber of a cylinder. A first oxygen storage capacity value (OSC1) is determined depending on the measured signals (MS1, MS2) from first and second exhaust probes. The exhaust catalyst is charged with oxygen until saturated. A given second rich air/fuel ratio is set in the combustion chamber of the cylinder. A second oxygen storage capacity value (OSC2) is determined depending on the measured signal from the first and second exhaust probe. A corrected oxygen storage capacity value (OSC_COR) is determined depending on the first and second oxygen storage capacity values (OSC1, OSC2).

4 Claims, 2 Drawing Sheets

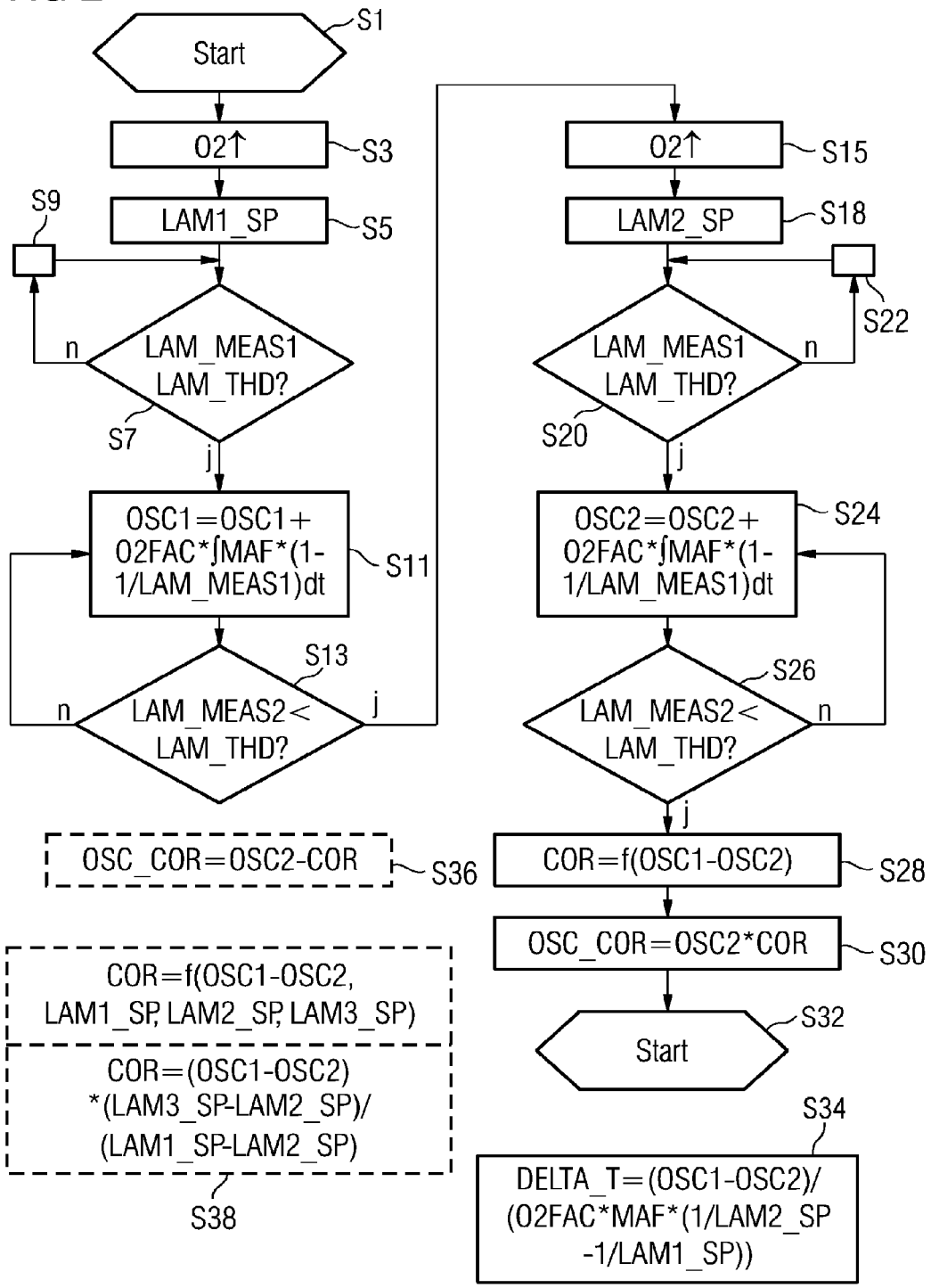

METHOD AND DEVICE FOR DETERMINING A DYNAMIC TIME DURATION FOR EXHAUST GAS PROBES OF AN INTERNAL COMBUSTION ENGINE

CROSS-REFERENCE TO RELATED APPLICATIONS

This application is a divisional of U.S. patent application Ser. No. 11/794,070 filed Jun. 22, 2007, now U.S. Pat. No. 7,849,671 which is a U.S. National Stage Application of International Application No. PCT/EP2005/055817 filed Nov. 8, 2005, which designates the United States of America, and claims priority to German Application No. 10 2004 062 408.9 filed Dec. 23, 2004, the contents of which are hereby incorporated by reference in their entirety.

FIELD OF INVENTION

The invention relates to a method and device for determining an oxygen storage capacity of an exhaust gas catalytic converter of an internal combustion engine. It also relates to a method and device for determining a dynamic time duration for exhaust gas probes of an internal combustion engine.

Increasingly stringent legal requirements relating to permitted pollutant emissions from motor vehicles, in which internal combustion engines are disposed, mean that pollutant emissions have to be kept as low as possible during operation of the internal combustion engine. This can be done on the one hand by reducing the pollutant emissions, which result in the respective cylinder of the internal combustion engine during the combustion of the air/fuel mixture. On the other hand exhaust gas post-treatment systems are used in internal, combustion engines to convert the pollutant emissions produced during the combustion process of the air/fuel mixture in the respective cylinders to harmless substances. To this end catalytic converters are used, which convert carbon monoxide, hydrocarbons and nitrogen oxides to harmless substances. Both, the specific influencing of the production of pollutant emissions during combustion and the conversion of pollutant components with a high level of efficiency by means of an exhaust gas catalytic converter require a very precisely set air/fuel ratio in the respective cylinder.

In this context it must be ensured that the components of the exhaust gas post-treatment system also function in the required manner over a long operating period and errors are reliably identified.

According to one aspect the object of the invention is to create a method and device, which allow precise determination of an oxygen storage capacity of an exhaust gas catalytic converter of an internal combustion engine. According to a further aspect the object of the invention is to create a method and device, which each allow precise determination of a dynamic time duration for exhaust gas probes of an internal combustion engine.

SUMMARY OF THE INVENTION

The object is achieved by the features of the independent claims. Advantageous refinements of the invention are characterized in the subclaims.

According to a first aspect the invention is characterized by a method and corresponding device for determining an oxygen storage capacity of an exhaust gas catalytic converter of an internal combustion engine with at least one cylinder and an exhaust gas tract, in which the exhaust gas-catalytic converter, a first exhaust gas probe upstream of the exhaust gas catalytic converter and a second exhaust gas probe downstream of the exhaust gas catalytic converter are disposed. The exhaust gas catalytic converter is charged with oxygen, until it is saturated, in other words no more oxygen can be chemically bound in the exhaust gas catalytic converter. A predetermined first rich air/fuel ratio is set in the combustion chamber of the cylinder. A first oxygen storage capacity is determined as a function of the measurement signals of the first and second exhaust gas probes. The exhaust gas catalytic converter is then charged with oxygen again, until it is saturated. A predetermined second rich air/fuel ratio is set in the combustion chamber of the cylinder. The second air/fuel ratio is different from the first air/fuel ratio.

A second oxygen storage capacity value is determined as a function of the measurement signals of the first and second exhaust gas probes. A corrected oxygen storage capacity value is determined as a function of the first and second oxygen storage capacity values.

The invention utilizes the knowledge that a changed response characteristic of the first and/or second exhaust gas probes results due to ageing or similar in an error in the determination of the first and second oxygen storage capacity values, which however differ due to the differing air/fuel ratio. This makes it possible to determine the corrected oxygen storage capacity value in a simple manner as a function of the first and second oxygen storage capacity values and thus to eliminate the error due to the changed response characteristic of the first and/or second exhaust gas probe in a simple and far-reaching manner.

According to a second aspect the invention is characterized by a method and corresponding device for determining an oxygen storage capacity of an exhaust gas catalytic converter of an internal combustion engine, which differs from the first aspect in that oxygen stored in the exhaust gas catalytic converter is completely discharged and therefore no more oxygen is chemically bound in the exhaust gas catalytic converter. A predetermined first lean air/fuel ratio is then set in the combustion chamber of the cylinder and the first oxygen storage capacity value is determined in respect of the measurement signals of the first and second exhaust gas probes. Oxygen stored in the exhaust gas catalytic converter is then completely discharged again. A predetermined second lean air/fuel ratio is then set in the combustion chamber of the cylinder. The second oxygen storage capacity value is determined as a function of the measurement signals of the first and second exhaust gas probes. A corrected oxygen storage capacity value is determined as a function of the first and second oxygen storage capacity values.

It is also possible in this manner to eliminate errors to a large degree during determination of the oxygen storage capacity value in accordance with the procedure of the first aspect.

According to an advantageous refinement a correction value is determined as a function of a difference between the first and second oxygen storage capacity values and the corrected oxygen storage capacity value is determined as a function of the second oxygen storage capacity value and the correction value. It is thus possible to determine the corrected oxygen storage capacity value in a very simple manner.

In this context it is advantageous if the correction value is determined from a set of characteristics as a function of the difference between the first and second oxygen storage capacity values. This is particularly precise and the set of characteristics can be determined in a simple manner by tests or simulations.

According to a further advantageous refinement the correction value is determined by means of a sectionally linear function as a function of the difference between the first and second oxygen storage capacity values. This has the advantage of a small storage requirement for the sectionally linear function and allows, simple and precise determination of the correction value.

According to a further advantageous refinement the correction value is determined as a function of the first, second or a third rich or lean air/fuel ratio. The third rich or lean air/fuel ratio is less rich or less lean than the first or second. It is thus possible to determine the correction value precisely in a simple manner.

The third rich or lean air/fuel ratio is preferably predetermined in an appropriate manner such that it is appropriately close to the stoichiometric air/fuel ratio. The third rich or lean air/fuel ratio therefore preferably corresponds essentially to the stoichiometric air/fuel ratio. In this context the knowledge is utilized that with the appropriately selected third rich or lean air/fuel ratio a change in the response characteristic of the first and/or second exhaust gas probe only impacts in a negligible manner on an oxygen storage capacity value thus determined.

In this context it is particularly advantageous, if the correction value is determined as a function, of a difference between the third and second air/fuel ratios divided by a difference between the first and second air/fuel ratios. This allows extremely precise determination of the correction value in a simple manner.

In a particularly advantageous manner a diagnosis of the exhaust gas catalytic converter can take place as a function of the corrected oxygen storage capacity value. The corrected oxygen storage capacity value is a measure of the efficiency of the exhaust gas catalytic converter. Diagnosis can for example include the checking of the corrected oxygen storage capacity value for compliance with a predeterminable value range.

According to a third aspect the invention is characterized by a method and corresponding device for determining a dynamic time duration for exhaust gas probes of an internal combustion engine with at least one cylinder and an exhaust gas tract, in which the exhaust gas catalytic converter, the first exhaust gas probe upstream of the exhaust gas catalytic converter and the second exhaust gas probe downstream of the exhaust gas catalytic converter are disposed. Determination of the first and second oxygen storage capacity values takes place in accordance with the procedure according to the first aspect of the invention. The dynamic time duration is determined as a function of the difference between the first and second oxygen storage capacity values and the first and second air/fuel ratios. The dynamic time duration is the sum of the changes over time in the response characteristic of the first and second exhaust gas probes compared with their new state. It is thus possible to determine the dynamic time duration in a simple and precise manner.

According to a fourth aspect the invention is characterized by a method and corresponding device for determining the dynamic time duration for exhaust gas probes of the internal combustion engine. The fourth aspect differs from the third aspect in that the first and second oxygen storage capacity values are determined in accordance with the procedure of the second aspect of the invention.

According to an advantageous refinement of the third or fourth aspect of the invention, diagnosis of the first and/or second exhaust gas probe takes place as a function of the dynamic time duration. The diagnosis can for example consist of checking whether the dynamic time duration is longer or shorter than a predeterminable value range. However it preferably consists of determining the change in the response characteristic of the first or second exhaust gas probe in another manner, so that conclusions can then be drawn about the change in the response characteristic of the respectively other exhaust gas probe as a function additionally of the dynamic time duration and this can then be checked in an appropriate manner to determine whether it is longer or shorter than a predeterminable value range.

BRIEF DESCRIPTION OF THE DRAWINGS

Exemplary embodiments of the invention are described in more detail below with reference to the schematic drawing, in which:

FIG. 2 shows a flow diagram of a program processed in the control device,

Elements with the same structure or function are marked with the same reference characters in all the figures.

DETAILED DESCRIPTION OF INVENTION

Figure 1:
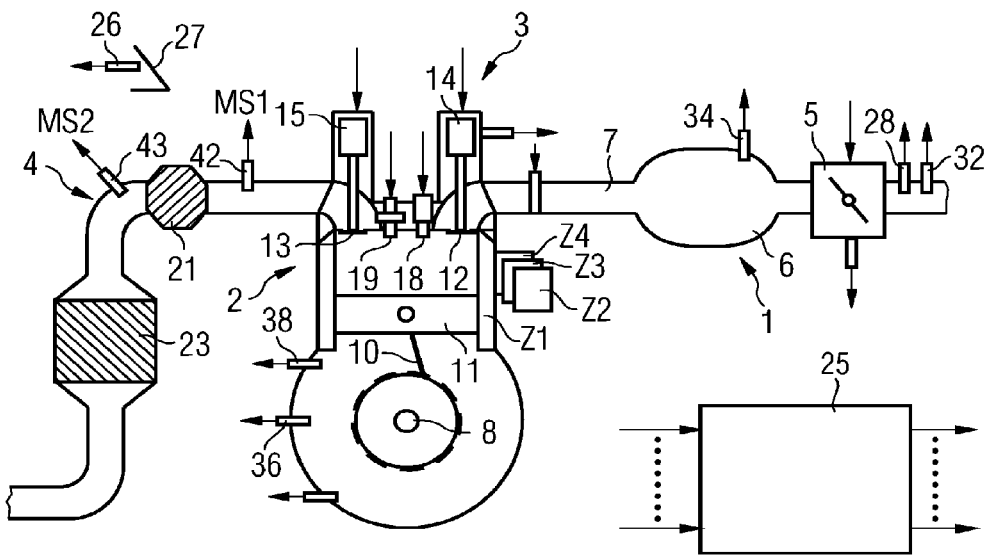
FIG. 1 shows an internal combustion engine with a control device.

An internal combustion engine (FIG. 1) has an intake tract 1, an engine block 2, a cylinder head 3 and an exhaust gas tract 4. The intake tract 1 preferably has a throttle valve 5, also a manifold 6 and an intake pipe 7, which leads to a cylinder Z1 via an inlet duct into the engine block 2. The engine block 2 also has a crankshaft 8, which is coupled via a connecting rod 10 to the piston 11 of the cylinder Z1.

The cylinder head 3 has a valve gear mechanism with a gas inlet valve 12 and a gas outlet valve 3.

The cylinder head 3 also has an injection valve 18 and a spark plug 19. The injection valve 8 can alternatively also be disposed in the intake pipe 7.

An exhaust gas catalytic converter, which is configured as a three-way catalytic converter 21, is disposed in the exhaust gas tract. A further exhaust gas catalytic converter is also preferably disposed in the exhaust gas tract, being configured as a NOX catalytic converter 22.

A control device 25 is provided, to which sensors are assigned, which detect different measured variables and determine the measured value of the measured variable in each instance. The control device 25 determines manipulated variables as a function of at least one of the measured variables and these are then converted to one or more actuating signals to control the final control elements by means of corresponding actuators. The control device 25 can also be referred to as a device for controlling the internal combustion engine.

The sensors are a pedal position sensor 26, which detects the position of an accelerator pedal 27, an air mass sensor 28, which detects an air mass flow upstream of the throttle valve 5, a first temperature sensor 32, which detects an intake air temperature, an intake pipe pressure sensor 34, which detects an intake pipe pressure in the manifold 6, a crankshaft angle sensor 36, which detects a crankshaft angle, to which a rotational speed is then assigned.

A first exhaust gas probe 42 is also provided, which is disposed upstream of the three-way catalytic converter 42 and which detects a residual oxygen content of the exhaust gas and whose measurement signal MS1 is characteristic of the air/fuel ratio in the combustion chamber of the cylinder Z1 and upstream of the first exhaust gas probe before oxidation of the fuel, hereafter referred to as the air/fuel ratio in the cylinders Z1-Z4. A second exhaust gas probe 43 is also provided, which is disposed downstream of the three-way catalytic converter 42 and which detects a residual oxygen content of the exhaust gas and whose measurement signal is characteristic of the air/fuel ratio in the combustion chamber of the cylinder Z1 and upstream of the second exhaust gas probe 43 before oxidation of the fuel, hereafter referred to as the air/fuel ratio downstream of the exhaust gas catalytic converter.

The first exhaust gas probe 42 is preferably a linear lambda probe. The second exhaust gas probe 43 is a binary lambda probe. It can however also be a linear lambda probe.

Any sub-set of the said sensors or even additional sensors can be present, depending on the embodiment of the invention.

The final control elements are for example the throttle valve 5, the gas inlet and gas outlet valves 12, 13, the injection valve 18 or the spark plug 19.

As well as the cylinder Z1, further cylinders Z2 to Z4 are also preferably provided, to which corresponding final control elements and optionally sensors are also assigned.

A program is stored in a program storage unit of the control device 25 and can be processed during operation of the internal combustion engine. The program can be used to determine a corrected oxygen storage capacity value or even a dynamic time duration DELTA_T.

The program started in a step S1 (FIG. 2), in which variables are optionally initialized. The start preferably takes place when a new corrected oxygen storage capacity value OSC_COR or a new dynamic time duration DELTA_T is to be determined. This can take place once per engine run for example or at permanently predetermined time intervals or even after a predeterminable drive distance.

In a step S2 the three-way catalytic converter 21 is charged with oxygen, until it is saturated.

In a step S5 a predetermined first air/fuel ratio LAM1_SP is predetermined in the combustion chambers of the cylinders Z1 to Z4 and preferably set by influencing the quantity of filet to be metered in, in particular by means of a lambda control. A step S7 is processed, after the predetermined first air/fuel ratio LAM1_SP has been predetermined, in other words at a time when a corresponding air/fuel ratio is still not necessarily actually set. In step S7 it is checked, whether the air/fuel ratio LAM_MEAS1 in the cylinders Z1 to Z4, as detected by the first exhaust gas probe 42, is lower than a predetermined threshold value LAM_THD. The threshold value LAM_THD preferably corresponds to the stoichiometric air/fuel ratio.

If the condition of step S7 is not satisfied, processing continues in a step S9, in which the program is held for a predeterminable time duration or a predeterminable crankshaft angle, before processing continues again in step 7. The time duration, for which the program is held in step S9, is selected to be suitably short, so that changes in the air/fuel ratio LAM_MEAS1 detected by the first exhaust gas probe 42 are detected quickly and with a high level of precision.

If however the condition of step S7 is satisfied, in a step S11 a term is added to a first oxygen storage capacity value OSC1, said term being the integral of an air mass flow MAF into the cylinders Z1 to Z4, multiplied by one minus the reciprocal value of the air/fuel ratio LAM_MEAS1 detected by the first exhaust gas probe 42. The term is also multiplied by an oxygen factor 02_FAC, which represents the proportion of oxygen in the air mass flow MAF. The oxygen factor 02_FAC has the value 0.23 for example. Integration takes place over the time duration since the last processing of step S11 in the current program run-through.

In a step S13 it is checked, whether the air/fuel ratio LAM_MEAS2 detected by the second exhaust gas probe 42 is lower than the threshold value LAM_THD. If this is not the case, processing continues again in step S11.

If however the condition of step S13 is satisfied, in a step S15—optionally after a certain time duration—the three-way catalytic converter 21 is again charged with oxygen, until it is saturated. Then in a step S18 a predetermined second air/fuel ratio LAM2_SP is predetermined in the combustion chambers of the cylinders Z1 to Z4 and is preferably actually set by means of the lambda controller. The predetermined second air/fuel ratio LAM2_SP is different from the predetermined first air/fuel ratio LAM1_SP. It can have an air ratio value of 0.9 for example and the predetermined first air/fuel ratio LAM1_SP can have an air ratio value of 0.8 for example. However the values preferably but not necessarily lie roughly in a range from 0.7 to 0.9 in respect of the air ratio of the predetermined first and second air/fuel ratios.

Processing then continues in a step S20 as in step S7. If the condition of step S20 is not satisfied, after being held in a step S22, which corresponds to step S9, processing continues again in step S20. If however the condition of step S20 is satisfied, in a step 24 the corresponding term is added to a second oxygen storage capacity value 0SC2, as in step S11.

In a step S26 it is checked, as in step S13, whether the air/fuel ratio LAM_MEAS2 detected by the second exhaust gas probe 43 is lower than the predetermined threshold value LAM_THD. If the condition of step S26 is not satisfied, processing continues again in step S24. If however the condition of step S26 is satisfied, no more oxygen is bound in the three-way catalytic converter 21.

In a step S28 a correction value COR is then determined as a function of a difference between the first and second oxygen storage capacity values 0SC1, 0SC2.

In a step S30 a corrected oxygen storage capacity value 0SC_COR is then determined, by multiplying the second oxygen storage capacity value 0SC2 by the correction value COR. The program is then terminated in a step S32.

The corrected oxygen storage capacity value OSC_COR can then be used for example to carry out a diagnosis of the three-way catalytic converter. The steps S9 to S13 and S18 to S28 are preferably carried out during a regeneration phase of the NOX storage-type catalytic converter 23. If there is no NOX storage-type catalytic converter present, the corresponding steps are preferably carried out during what is known as a purge phase of the three-way catalytic converter 21. The purge phase for example follows on from a thrust operation of the internal combustion engine without the metering in of fuel.

The corrected oxygen storage capacity value OSC_COR can then be used to carry out a diagnosis of the three-way catalytic converter 21. This can be done for example by checking whether the corrected oxygen storage capacity value OSC_COR is within a predeterminable value range. The procedure in accordance with step S9 to S13 and S18 to S28 can also be referred to as the breakdown method.

The correction value COR can be determined in step S28 for example from a set of characteristics, with a set of characteristics also being used to refer to what is known as a characteristic curve, as a function of the difference between the first and second oxygen storage capacity values. The set of characteristics can be determined simply by tests, for example on an engine test-bed, or by means of appropriate simulations and is stored in a data storage unit of the control device 25.

Alternatively the correction value can also be determined in step S28 by means of a sectionally linear function as a function of the difference between the first and second oxygen storage capacity values OSC1, OSC2. The sectionally linear function preferably has two linear sections, the gradients of which are a function of the sign in front of the difference between the first and second oxygen storage capacity values OSC1, OSC2. The respective gradients and straight sections can similarly be determined by means of appropriate tests, for example on the engine test bed, or by means of appropriate simulations and can be stored in the data storage unit of the control device 25.

The correction value COR can also be determined, as specified in a step S38, as a function of the difference between the first and second oxygen storage capacity values OSC1 OSC2, the predetermined first and second air/fuel ratios LAM1_SP, LAM2_SP and a predetermined third air/fuel ratio LAM3_SP in the combustion chambers of the cylinders Z1 to Z4. The predetermined third air/fuel ratio LAM3_SP is less rich than the first and second predetermined air/fuel ratio and is preferably close to the stoichiometric air/fuel ratio. It can for example have a value of 0.9999 in respect of the air ratio.

The correction value COR is calculated in step S38 by means of the formula given there. Appropriate selection of the predetermined third air/fuel ratio LAM3_SP allows the correction value COR to be determined very precisely. If the correction value COR is calculated according to step S38, the corrected oxygen storage capacity value OSC_COR is preferably determined in step S36 by forming a difference between the second oxygen storage capacity value OSC2 and the correction value.

As an alternative or in addition to steps S28 and S30 or S38 and S36, a step S34 can also be provided, in which the dynamic time duration DELTA_T is determined as a function of the difference between the first and second oxygen storage capacity values OSC1, OSC2, the air mass flow MAF, the oxygen factor 02_FAC and the predetermined first and second air/fuel ratios LAM1_SP, LAM2_SP, preferably in accordance with the formula specified in step S34.

The dynamic time duration DELTA_T represents changes in the response characteristics of the first and second exhaust gas exhaust gas probe dynamics. In particular the second exhaust gas probe 43 can thus be subjected particularly effectively to a diagnosis, with the first exhaust gas probe 42 then preferably being tested in a different manner in respect of the change in its response duration, so that it is possible to draw conclusions about the change in the response duration of the second exhaust gas probe 43 by means of the dynamic time duration DELTA_T and this can then be tested to determine whether it is longer or shorter than a predeterminable value range.

The second rich air/fuel ratio LAM2_SP is preferably less rich than the predetermined first rich air/fuel ratio LAM1_SP. This can however also be turned round, with the result that the sign in front of the correction value COR has to be adjusted.

In an alternative refinement the program according to FIG. 2 can also be configured in such a manner that in steps S3 and S15 the oxygen stored respectively in the three-way catalytic converter 21 is completely discharged. The first and second air/fuel ratios predetermined in steps S9 and S18 are then selected to be correspondingly lean, with the predetermined first air/fuel ratio then preferably being leaner than the predetermined second air/fuel ratio LAM2_5P. The less than sign is then replaced by a more than sign in the conditions of steps S5, S13, S20 and S26.

Figure 3:
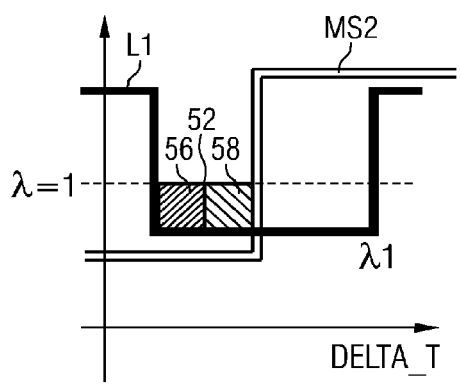
FIGS. 3 and 4 show different signal profiles.
Figure 4:
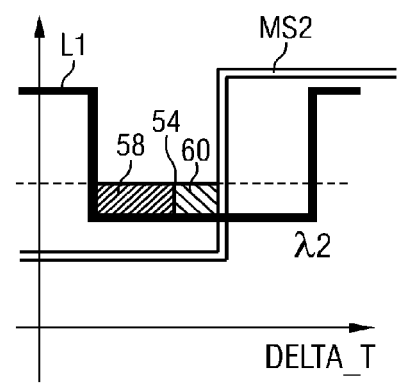

In FIGS. 3 and 4 the measurement signals MS2 of the second exhaust gas probe 43 and an air/fuel ratio derived from the measurement signal MS1 of the first exhaust gas probe 42 respectively are expressed by the air ratio L1. The broken line represents the stoichiometric air ratio. The surface of the rectangle, marked 52, is representative of the first oxygen storage capacity value OSC1. The surface in FIG. 4, marked with the reference character 54, is representative of the second oxygen storage capacity value OSC2. The partial surfaces 56 and 58 have the same surface content and correspond to the true oxygen storage capacity value. The partial surfaces 58 and 60 extend over the dynamic time duration DELTA_T and their surface content is thus a function of the respective predetermined first or second air/fuel ratio LAM1_SP, LAM_2SP. The closer the respective predetermined air/fuel ratio is to the stoichiometric air/fuel ratio, the smaller the overall proportion of the respective overall surface formed by the partial surfaces.

What is claimed is:

1. A method for determining a dynamic time duration for exhaust gas probes of an internal combustion engine having at least one cylinder and an exhaust gas tract, in which an exhaust gas catalytic converter, a first exhaust gas probe upstream of the exhaust gas catalytic converter and a second exhaust gas probe downstream of the exhaust gas catalytic converter are disposed, comprising:
    charging the exhaust gas catalytic converter with oxygen until the converter is saturated;
    setting a predetermined first rich air/fuel ratio in a combustion chamber of the cylinder;
    determining a first oxygen storage capacity value as a function of first measurement signals of the first and second exhaust gas probes;
    charging the exhaust gas catalytic converter with oxygen until the converter is saturated;
    setting a predetermined second rich air/fuel ratio in the combustion chamber of the cylinder;
    determining a second oxygen storage capacity value as a function of second measurement signals of the first and second exhaust gas probes; and
    determining a dynamic time duration as a function of the first and second oxygen storage capacity values.

2. The method as claimed in claim 1, wherein a diagnosis of at least one of the first and second exhaust gas probes takes place as a function of the dynamic time duration.

3. A device for determining a dynamic time duration for exhaust gas probes of an internal combustion engine having at least one cylinder and an exhaust gas tract, in which an exhaust gas catalytic converter, a first exhaust gas probe upstream of the exhaust gas catalytic converter and a second exhaust gas probe downstream of the exhaust gas catalytic converter are disposed, comprising:
    an oxygen charging device configured to charge the exhaust gas catalytic converter with oxygen until saturated;
    an air/fuel ratio setting device configured to (a) set a predetermined first rich air/fuel ratio ratios in a combustion chamber of the cylinder after the oxygen charging device charges the exhaust gas catalytic converter with oxygen until saturated, and (b) subsequently set a predetermined second rich air/fuel ratio ratios in the combustion chamber of the cylinder after the oxygen charging device charges the exhaust gas catalytic converter with oxygen until saturated;
    an oxygen storage capacity value determining device configured to determine a first oxygen storage capacity value as a function of first measurement signals of the first and second exhaust gas probes and a second oxygen storage capacity value as a function of second measurement signals of the first and second exhaust gas probes; and a control device configured to determine a dynamic time duration as a function of the first and second oxygen storage capacity values.

4. The device as claimed in claim 3, wherein the control device is further configured to perform a diagnosis of at least one of the first and second exhaust gas probes as a function of the determined dynamic time duration.

* * * * *